US007726003B1

(12) United States Patent
Rocha

(10) Patent No.: US 7,726,003 B1
(45) Date of Patent: Jun. 1, 2010

(54) DOOR PAINTING SUPPORT METHOD

(76) Inventor: Juan Rocha, 12052 Rose Hedge Dr., Whittier, CA (US) 90606

( * ) Notice: Subject to any disclaimer, the term of this patent is extended or adjusted under 35 U.S.C. 154(b) by 516 days.

(21) Appl. No.: 11/769,523

(22) Filed: Jun. 27, 2007

Related U.S. Application Data

(62) Division of application No. 10/944,114, filed on Sep. 20, 2004, now abandoned.

(51) Int. Cl.
*B23Q 7/00* (2006.01)

(52) U.S. Cl. .......................................................... 29/559

(58) Field of Classification Search ................... 29/559, 29/464, 455, 467, 468, 460, 281.1, 281.5, 29/281.6; 269/51, 296, 50–52; 248/688, 248/165

See application file for complete search history.

(56) References Cited

U.S. PATENT DOCUMENTS

| | | | |
|---|---|---|---|
| 3,844,548 A | | 10/1974 | Rogers |
| 4,050,671 A | | 9/1977 | Coleman |
| 4,103,305 A | | 7/1978 | Gualano |
| 4,577,843 A | * | 3/1986 | Milwain ...................... 269/51 |
| 5,085,397 A | * | 2/1992 | Henkel ....................... 248/688 |
| 5,164,011 A | | 11/1992 | Ray |
| 6,090,204 A | | 7/2000 | Speed et al. |
| 6,123,173 A | | 9/2000 | Patros |
| 6,338,758 B1 | | 1/2002 | Curran |
| 6,561,470 B1 | | 5/2003 | Gottfredson et al. |
| 6,702,130 B1 | | 3/2004 | Carlilse |

* cited by examiner

*Primary Examiner*—John C Hong
(74) *Attorney, Agent, or Firm*—Kenneth L. Green

(57) ABSTRACT

A simple and versatile door support system holds a door by attaching to top and bottom edges. The system allows the two visible door faces and the two visible door edges to be painted at one time, and may be converted to hold a door horizontally or to transport a door. The system includes four support blocks which mount to corners of top and bottom surfaces of the door. The blocks have mounting features for mounting to the door, and attachment features for attaching one or more attachments. A rod attachment may be connected to each of the four blocks to support the door horizontally, and a pair of support shoes may be attached to two of the blocks to support the door vertically or on an edge. Casters may be attached directly to the blocks, or indirectly to the blocks (e.g., to the attachments), to transport the door.

19 Claims, 4 Drawing Sheets

DOOR PAINTING SUPPORT METHOD

The present application is a Divisional of U.S. application Ser. No. 10/944,114, filed Sep. 20, 2004, which application is incorporated in it's entirely herein by reference.

BACKGROUND OF THE INVENTION

The present invention relates to a support for doors, and more particularly to a simple low cost support which allows all four visible sides of a door to be painted, and which support may be converted to facilitate transportation of doors.

Typical construction or remodeling projects generally require that a number of doors be painted. Doors have four visible surfaces comprising two door faces and two door edges which are visible when the door is hung. Various methods have been used to support doors for painting, including leaning a door against a wall or supporting a door on it's side using wood clamps. Unfortunately, such methods do not allow all the visible door surfaces to be painted at once, and substantially increases the time required to paint the doors.

A door rack system is described in U.S. Pat. No. 6,338,758 for "Multiple Object Paint Rack System," which attaches at the mid points and near the bottoms of the visible door edges. The rack of the '758 patent minimizes the unpainted areas of the door, and allows several doors to be transported on a single base. Unfortunately, the rack of the '758 patent requires attachment to visible edge, and is a fairly substantial structure not likely to be purchased by an individual for personal use.

A rotisserie like structure for suspending a door between saw horses is described by U.S. Pat. No. 6,561,470 for "System and Method for Treating Object Surfaces". Metal plates are provided which attach to the top and bottom edges of the door, and not to any of the four visible surfaces. Cylindrical shafts attach to the plates, which shafts rotate in supports attached to the saw horses. Although the system of the '470 patent allows all four visible surfaces of a door to be painted, little versatility is provided, and the doors are not easily moved while attached to the rotisserie.

A door painting rack is described in U.S. Pat. No. 6,702,130 for "Door Painting Rack," which vertically supports one or two doors. The door is supported by a bottom bracket which the bottom edge of the door rests on, and a top pin which is biased against the door top edge by a spring. Although the rack of the '130 patent provides access to all four visible sides on the door, the assembly is rather complex and likely to be expensive. Therefore, the rack is unlikely to be purchased for a single use or for limited personal use.

BRIEF SUMMARY OF THE INVENTION

The present invention addresses the above and other needs by providing a simple and versatile door support system which holds a door by attaching to top and bottom edges. The system allows the two visible door faces and the two visible door edges to be painted at one time, and may be converted to hold a door horizontally or to transport a door. The system includes four support blocks which mount to corners of top and bottom surfaces of the door. The blocks have mounting features for mounting to the door, and attachment features for attaching one or more attachments. A rod attachment may be connected to each of the four blocks to support the door horizontally, and a pair of support shoes may be attached to two of the blocks to support the door vertically or on an edge. Casters may be attached directly to the blocks, or indirectly to the blocks (e.g., to the attachments), to transport the door.

In accordance with one aspect of the invention, there is provided a door support system comprising at least two blocks and at least two attachments. Each block includes a pair of countersunk holes for mounting said blocks to at least one first door edge and a mounting face for residing against the at least one first door edge. An end face of the block is perpendicular to the mounting face, wherein the block may be mounted in a manner resulting in the end face being substantially parallel to a second door edge, which second door edge is substantially perpendicular to the at least one first door edge. At least one side face of the block is perpendicular to the mounting face, wherein the block may be mounted in a manner resulting in the side face being substantially parallel to a door face which door face is substantially perpendicular to the at least one first door edge and the second door edge. Attachment features resides on the end face and on the at least one side face. At least two attachments are provided for supporting the door in at least one position, wherein the attachments are removably attachable to the blocks using the attachment features.

In accordance with a second aspect of the present invention, a method for supporting a door is provided. The method comprises attaching a first block to one side of a first edge of the door, attaching a second block to an adjacent side of an opposite edge of the door, attaching a first shoe to the first block, attaching a second shoe to the second block, and lifting the door to an on edge position. Thus positioned, the door may be painted, hardware may be fitted and/or attached, or other work done on the door. Further, casters may be attached to the blocks directly, or to the shoes, or other attachments, to facilitate transportation of the door.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

The present invention provides a simple and versatile door support system which holds a door by attaching to top and bottom surfaces, which top and bottom surfaces are not visible when the door is mounted. The system allows all four visible sides of a door (the front and back faces and two door edges) to be painted at one time, and may be converted to hold a door horizontally or to transport a door. The system includes four support blocks which mount to corners of top and bottom surfaces of the door. The blocks have mounting features for mounting to the door, and attachment features for connection of one or more attachments. A rod attachment may be connected to each of the four blocks to support the door horizontally, and a pair of bases may be attached to two of the blocks to support the door vertically or on an edge. Casters may be attached directly to the blocks, or indirectly to the blocks (e.g., to the bases), to transport the door.

Figure 1A:
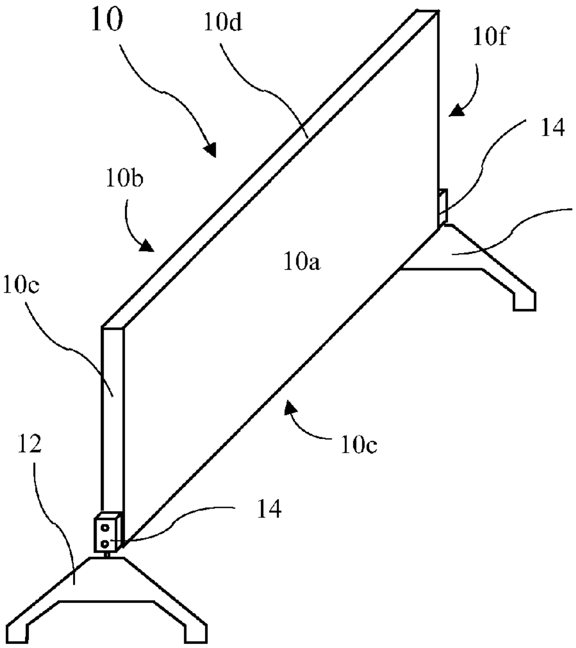
FIG. 1A is a door supported on edge using blocks and shoe supports according to the present invention.

A door 10 supported on edge using blocks 14 and support shoes 12 is shown in FIG. 1A. The door 10 has substantially parallel door faces 10*a* and 10*b*, substantially parallel door edges 10*c* and 10*d*, and substantially parallel door top edge 10*e* and door bottom edge 10*f*. Further, the door faces 10*a* and 10*b* are substantially perpendicular to the door edges 10*c* and 10*d*, and to the top edge 10*e* and bottom edge 10*f*. The door edges 10*c* and 10*d* are substantially perpendicular to the top edge 10*e* and bottom edge 10*f*. Within the context of the present invention, substantially parallel and substantially perpendicular means within normal building tolerances. Further, the door edges 10*c* and 10*d* and the top edge 10*e* and bottom edge 10*f* may collectively be referred to as edges or edges of the door.

Continuing with FIG. 1A, the blocks 14 are attached to corresponding ends of the door top edge 10*e* and the door bottom edge 10*f*, which edges 10*e* and 10*f* are not visible when the door 10 is hung in a doorway for use. The blocks 14 are preferably mounted to the door 10 using wood screws passing through countersunk holes 22 (see FIG. 4) and into the edges 10*e*, 10*f*. Although the blocks 14 are preferably mounted to the door edges 10*e*, 10*f* (edges 10*e* and 10*f* are not visible when the door 10 is hung,) the blocks 14 may also be mounted to door edges 10*c* and 10*d* which are visible when the door is hung. Shoes 12 are attached to the blocks 14 to provide stable support for the door 10. Thus supported, door faces 10*a* and 10*b* and the door edges 10*c* and 10*d*, are all uncovered and may be painted at one time.

Figure 1B:
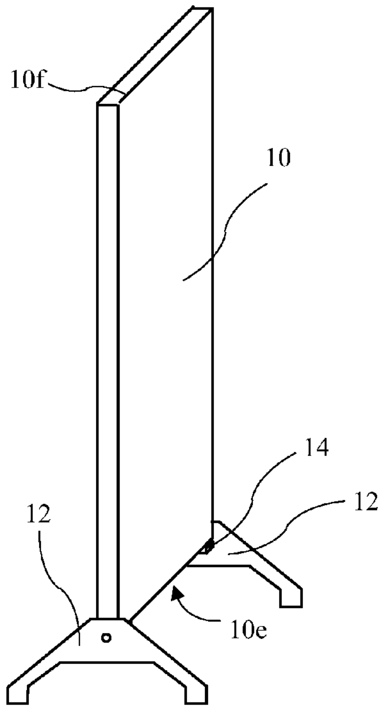
FIG. 1B is the door supported vertically using the blocks and the shoe supports according to the present invention.
Figure 1C:
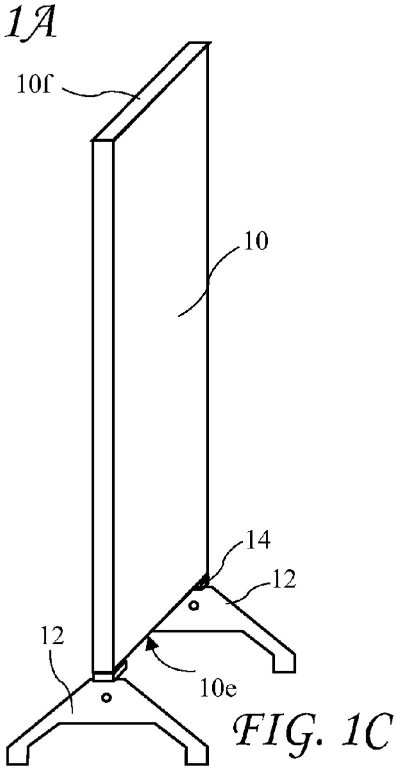
FIG. 1C is the door supported vertically using the blocks and the shoe supports under the blocks according to the present invention.

The door 10 is shown supported vertically using the blocks 14 and the shoes 12 in FIG. 1B, and with the shoes 12 under the blocks in FIG. 1C. The blocks 14 are attached to ends of the edge 10*e*, or may be mounted to ends of the edge 10*f*. The shoes 12 may be attached to the blocks 14 using first studs 20*a* or second studs 20*b* (see FIGS. 3A, 3B, 3C).

Figure 2:
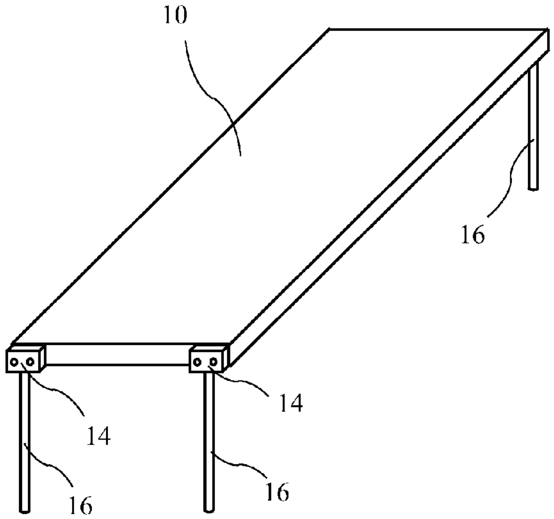
FIG. 2 depicts a door supported horizontally by the blocks and rods according to the present invention.

The door 10 is shown supported horizontally by the blocks 14 and rods 16 in FIG. 2. The rods 16 are preferably aluminum rods with at least one threaded end for attachment to attachment features 24 (see FIGS. 4, 5A, 5B, 5C). The rods 16 are preferably approximately sixteen inches long and ⅜ inch in diameter. The threaded end of the rod 16 preferably has a ⅜ by 16 thread.

Figure 3C:
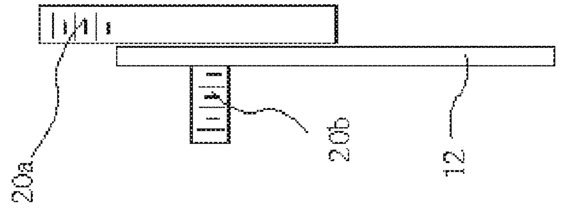
FIG. 3C shows a side view of the shoe.
Figure 3B:
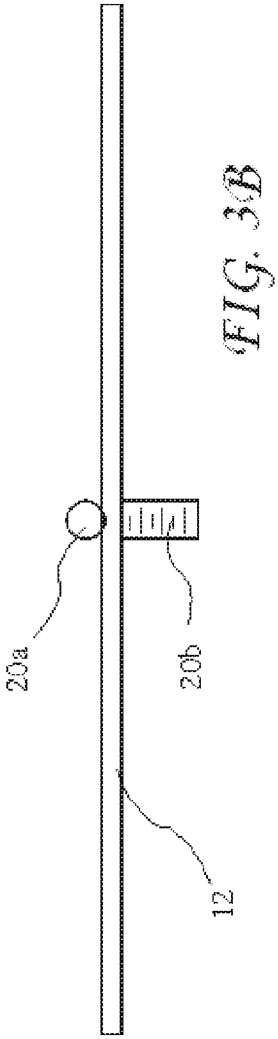
FIG. 3B shows a top view of the shoe.
Figure 3A:
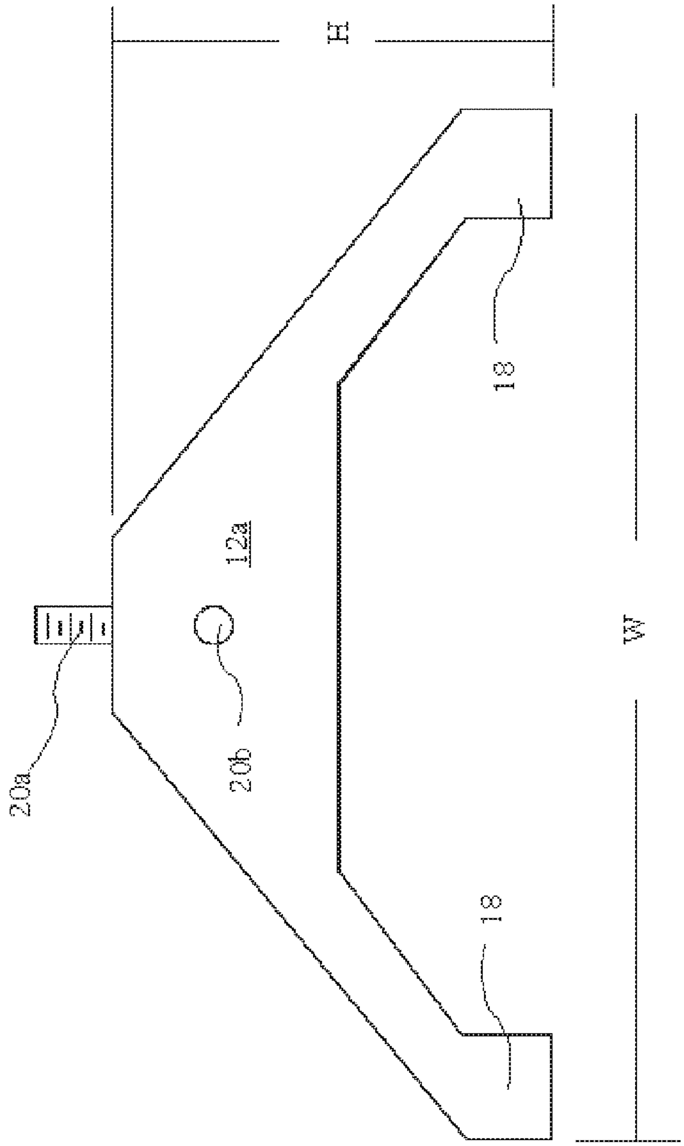
FIG. 3A shows a front view of the shoe.

A front view of the shoe 12 is shown in FIG. 3A, a top view of the shoe 12 in FIG. 3B, and an end view of the shoe 12 in FIG. 3C. The shoe 12 has two feet 18 for support. The shoe 12 preferably has an overall width W of approximately ten inches and preferably a height H of approximately six inches. A first stud 20*a* extends vertically upwardly from the shoe 12 for attachment to attachment features 24 (see FIGS. 5A, 5B, 5C). A second stud 20*b* extends laterally from a shoe face 12*a* of the shoe 12, for attachment to attachment features 24. The shoe 12 may be shaped like an inverted "V" as shown, or have any other shape providing lateral displacement of the feet 18, and door support systems having any shoe which attaches to a block, thereby providing lateral support, is intended to come within the scope of the present invention. The shoe 12 may be made from aluminum or plastic.

Figure 4:
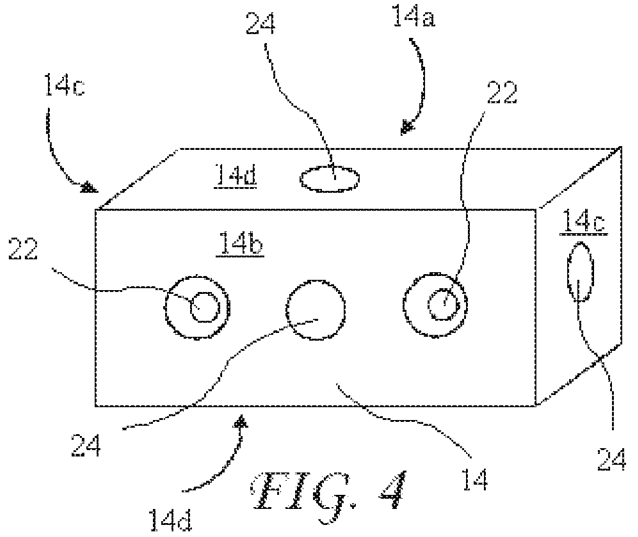
FIG. 4 is a perspective view of the block.

A detailed perspective view of the block 14 is shown in FIG. 4. The block 14 has a mounting face 14*a* for residing against a corresponding door edge 10*c*, 10*d*, 10*e*, or 10*f* (see FIG. 1A), and an opposite face 14*b* opposite the mounting face 14*a*. Two end faces 14*c* are perpendicular to the mounting face 14*a*, wherein the block 14 may be mounted to the door top edge 10*e* and/or door bottom edge 10*f* in a manner resulting in the end faces 14*c* being substantially parallel to the door edges 10*c* and 10*d*. Two side faces 14*d* are perpendicular to the mounting face 14*a*, wherein the block 14 may be mounted to the door top edge 10*e* and/or door bottom edge 10*f* in a manner resulting in the end faces 14*c* being substantially parallel to the door faces 10*a* and 10*b*. Further, the blocks 14 may be mounted to the door edges 10*c* and/or 10*d*, creating a similar parallel relationship door top edge 10*e* and door bottom edge 10*f*.

Figure 5B:
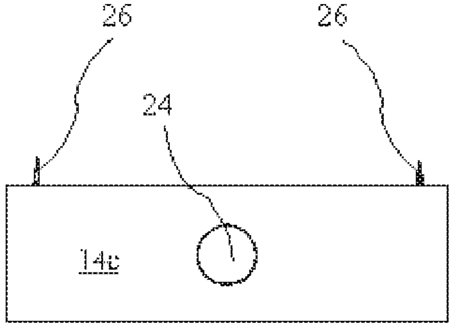
FIG. 5B shows a top view of the block.
Figure 5A:
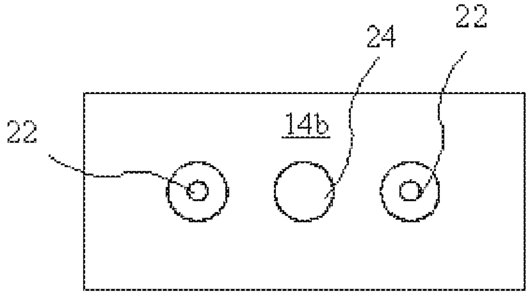
FIG. 5A shows a front view of the block.
Figure 5C:
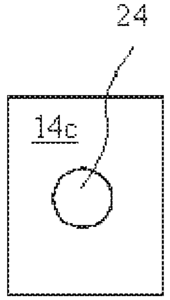
FIG. 5C shows a side view of the block.

A front view of the block 14 is shown in FIG. 5A, a top view of the block 14 is shown in FIG. 5B, and a side view of the block 14 is shown in FIG. 5C. An attachment feature 24 comprising a threaded hole is shown on the opposite face 14*b*, the end face 14*c*, and the side face 24. Spikes 26 reside on the mounting face 14*a*, which spikes 26 hold the block in place while fasteners (preferably wood screws) are installed through countersunk holes 22. The blocks 14 are preferably made from aluminum or plastic, and when the blocks are made from plastic, metal thread inserts may be used in the attachment features to extend the life of the blocks 14.

Figure 6:
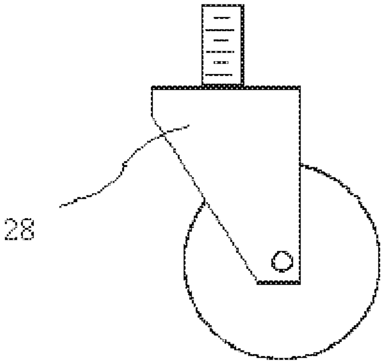
FIG. 6 is a caster which may be attached to the support to facilitate transportation of the door.

A caster 28 which may be attached to the block 14, the rod 16, or the shoe 12 to facilitate transportation is shown in FIG. 6.

Figure 7:
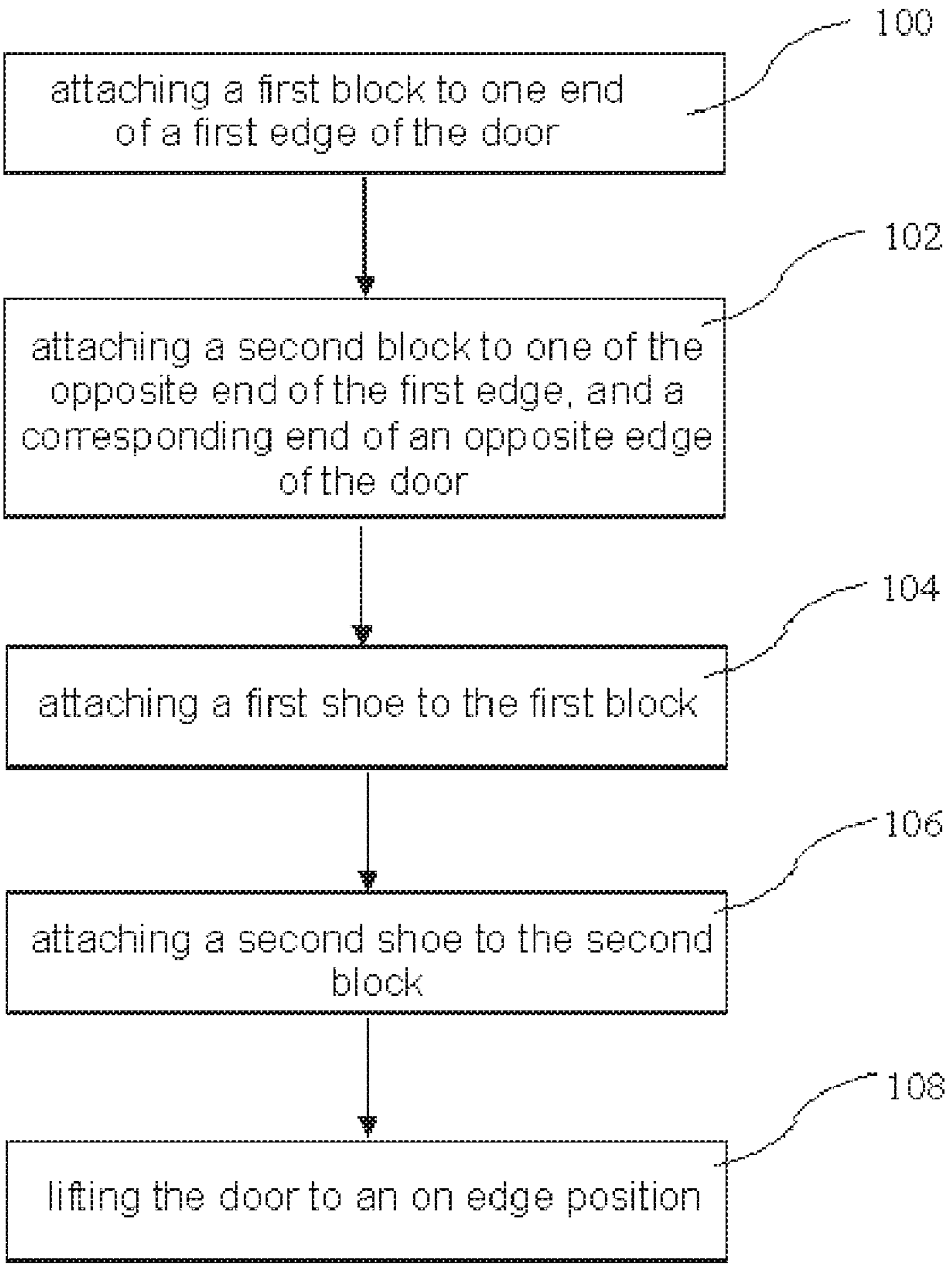
FIG. 7 is a method for supporting a door using the support system.

A method for supporting a door 10 using the present invention is described in FIG. 7. The method comprises attaching a first block to one side of a first edge of the door at step 100. Attaching a second block to an adjacent side of an opposite edge of the door at step 102. Attaching a first shoe to the first block at step 104. Attaching a second shoe to the second block at step 106. Lifting the door to an on edge position at step 108. Thus positioned, the door may be painted, hardware may be fitted and/or attached, or other work done on the door. Further, casters may be attached to the blocks directly, or to the shoes, or other attachments, to facilitate transportation of the door.

While the invention herein disclosed has been described by means of specific embodiments and applications thereof, numerous modifications and variations could be made thereto by those skilled in the art without departing from the scope of the invention set forth in the claims.

I claim:

1. A method for supporting a door having substantially parallel door faces, substantially parallel door side edges, and substantially parallel door top and bottom edges, the method comprising:

attaching a first block to one end of one of the edges of the door using at least two spaced apart first fasteners inserted through spaced apart first holes in the first block and into the door to positionally and rotationally fix the first block to the door, leaving the door faces uncovered;

attaching a second block, leaving the door faces uncovered, using at least two spaced apart second fasteners inserted through spaced apart second holes in the second block to positionally and rotationally fix the first block to the door to one selected from the group consisting of:

an opposite end of the edge of the door which the first block is attached to; and a corresponding end of an opposite edge of the door, attaching a first support to the first block to positionally and rotationally fix the first support to the first block;

attaching a second support to the second block to positionally and rotationally fix the second support to the second block; and supporting the door by the supports.

2. The method of claim 1, wherein:

attaching the first block comprises attaching the first block to the door using two nails inserted through the first holes in the first block and into the door; and attaching a second block comprises attaching the second block to the door using two nails inserted through the second holes in the second block and into the door.

3. The method of claim 1, wherein:

attaching the first block comprises attaching the first block to the door using two wood screws inserted through two of the first holes in the first block and into the door; and attaching a second block comprises attaching the second block to the door using two of the wood screws inserted through two of the second holes in the second block and into the door.

4. The method of claim 1, wherein attaching a first block to one end of one of the edges of the door comprises attaching the first block to one of the edges selected from the group consisting of the top edge and the bottom edge.

5. The method of claim 1, wherein:

attaching a first support to the first block comprises attaching the first support to a first parallel surface of the first block residing parallel to one of the edges of the door; and attaching a second support to the second block comprises attaching the second support to a second parallel surface of the second block residing parallel to the first parallel surface of the first block.

6. The method of claim 1, wherein:

attaching a first support to the first block comprises attaching the first support to a first perpendicular surface of the first block residing perpendicular to one of the faces of the door; and attaching a second support to the second block comprises attaching the second support to a second perpendicular surface of the second block residing parallel to the first perpendicular surface of the first block.

7. The method of claim 1, wherein:

attaching a first support to the first block comprises attaching the first support to a first end face of the first block perpendicular to a first mounting face of the first block residing against the door; and attaching a second support to the second block comprises attaching the second support to a second end face of the second block residing parallel to the first end face of the first block.

8. The method of claim 1, wherein:

attaching a first support to the first block comprises attaching the first support to a first surface of the first block residing parallel to one of the faces of the door; and attaching a second support to the second block comprises attaching the second support to a surface of the second block residing parallel to the first surface of the first block.

9. The method of claim 1, wherein:

attaching a support to the first block comprises attaching the support to a first opposite face of the first block parallel to a first mounting face of the first block residing against the door; and attaching a support to the second block comprises attaching the support to a second opposite face of the second block parallel to a second mounting face of the second block residing against the door.

10. The method of claim 1, wherein attaching a support to the first block comprises attaching a support including two spaced apart feet to support the door vertically for painting.

11. The method of claim 1, wherein attaching the blocks to the edge comprises attaching the blocks to the edge with side faces of the blocks parallel with the door faces, wherein the side faces do not extend wider than the door faces, thereby not obstructing painting the door faces.

12. The method of claim 1, further including;

attaching a third block and a fourth block to edges of the door, wherein the blocks are attached near four ends of the top and bottom edges of the door; and attaching rods to each of the blocks to support the door.

13. The method of claim 1, wherein;

attaching supports to the blocks comprises attaching shoes to faces of the blocks parallel with the bottom edge and the top edge of the door; and supporting the door by the supports comprises supporting the door vertically by the supports.

14. A method for supporting a door to be painted, the door having parallel door faces to be painted, parallel door side edges to be painted, a door top edge, a door bottom edge, and a door thickness, the method comprising:

attaching a pair of support attachment blocks to at least one of the door bottom and top edges, each one near a side edge, said support attachment blocks having a mounting face for direct contact with the door, an opposite face opposite the mounting face, a top face, a bottom face, and two end faces, and said support attachment blocks including two spaced apart fasteners for non-rotatably affixing the blocks to at least one of the door bottom and top edges, and said support attachment blocks including holes through at least one face of the attachment blocks for affixing a door support to each of the support attachment blocks; and vertically inserting a stud fixedly attached to the door support into the holes in the at least two of said support attachment blocks whereby the door can be supported above a floor and painted without interference from the support attachment blocks.

15. The method of claim 14, wherein the distance between the top and bottom faces being not substantially greater than the door thickness, said support attachment block being attached so that the top and bottom edges are approximately parallel to the parallel door faces and centered between the parallel door faces so that neither the top face nor the bottom face extend substantially above or below the door faces, and no part of the support attachment blocks extend over a parallel door face or a parallel door side edge for allowing the door faces and the door side edges to be painted.

16. The method of claim 14, wherein the holes in the support attachment blocks extend vertically and the studs fixedly attached to the door support shoes reach vertically into the holes when the door is positioned for painting.

17. The method of claim 14, wherein the holes in the support attachment blocks are threaded horizontal holes and the studs fixedly attached to the door support shoes include stud threads cooperating with the threaded holed in the support attachment blocks to hold the door is position for painting.

18. A method for supporting a door having substantially parallel door faces, substantially parallel door side edges, and substantially parallel door top and bottom edges, the method comprising:

positioning a first mounting face of a first block against a first end of one of the edges of the door, leaving the door faces and remaining edges uncovered;

positioning a first end face including a first end attachment feature perpendicular to the door faces;

positioning a first side face including a first side attachment feature parallel to the door faces;

attaching the positioned first block to the door using two spaced apart first fasteners to non-rotatably fix the first block to the door;

positioning a second mounting face of a second block against one of:

a second end of the edge of the door which the first block is attached to; and an end of one of the edges of the door opposite the first block, leaving the door faces and remaining edges uncovered;

positioning a second end face including a second end attachment feature perpendicular to the door faces;

positioning a second side face including a second side attachment feature parallel to the door faces;

attaching the positioned second block to the door using two spaced apart second fasteners to non-rotatably fix the first block to the door;

attaching a first support to any of the attachment features of the first block;

attaching a second support to one of the attachment features of the second block parallel to the attachment feature of the first block which the first support is attached to; and lifting the door to an on-edge position wherein the cooperation of the supports and the attachment features comprise studs inserted into hole and wherein the studs extend vertically when the door is in the on-edge position.

19. The method of claim 16, wherein:

the attachment features comprise holes in the faces of the first and second blocks and studs are fixedly attached to the supports; and the cooperation of the studs with the holes holds the door on edge.

* * * * *